United States Patent
Van Snellenberg

[11] 3,714,681
[45] Feb. 6, 1973

[54] CUTTING APPARATUS FOR TISSUE-LIKE MATERIAL

[75] Inventor: Anton P. M. Van Snellenberg, Vancouver, British Columbia, Canada

[73] Assignee: The Canadian Fishing Company Limited, Vancouver, Britich Columbia, Canada

[22] Filed: Aug. 10, 1970

[21] Appl. No.: 62,492

[52] U.S. Cl............................................17/1 R, 83/22
[51] Int. Cl...............................................A22c 25/00
[58] Field of Search........17/1, 53, 67; 83/22; 408/58

[56] References Cited

UNITED STATES PATENTS

| 1,997,843 | 4/1935 | Warrell................................83/22 X |
| 2,690,587 | 10/1954 | Truffaut..................................17/1 R |

FOREIGN PATENTS OR APPLICATIONS

| 681,973 | 10/1952 | Great Britain..........................17/1 R |
| 187,185 | 1/1964 | Sweden....................................17/1 R |

Primary Examiner—Lucie H. Laudenslager
Attorney—Fetherstonhaugh & Co.

[57] ABSTRACT

Apparatus for cutting tissue-like material from a soft or unsupported background material, such as cutting glands out of membranes in heads of fish. The tissue is drawn against a suction head, and a cutter sleeve surrounding the head cuts the background material around said tissue. The removed tissue is blown from the suction head.

16 Claims, 10 Drawing Figures

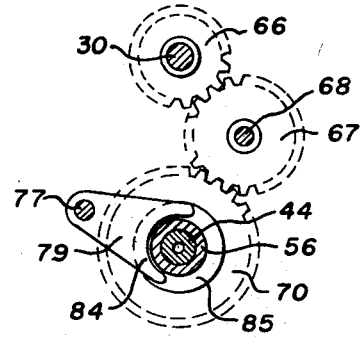
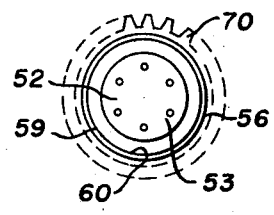
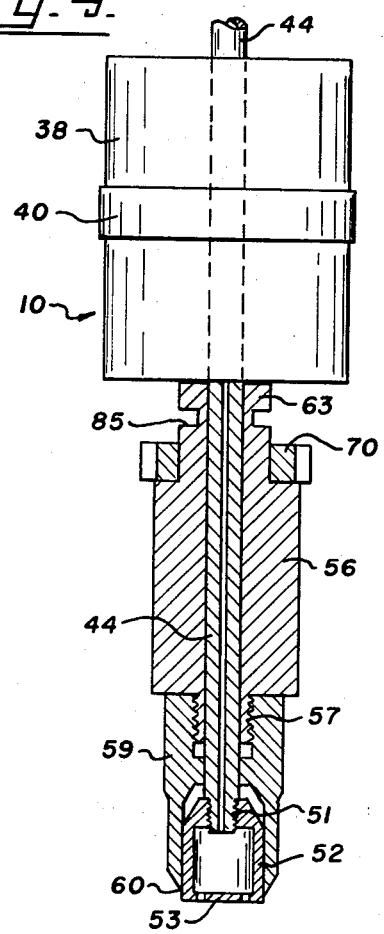
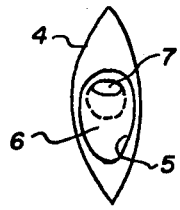
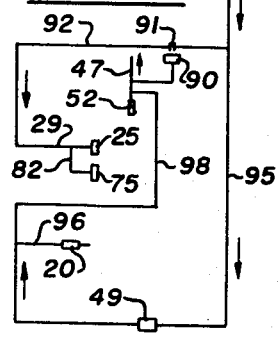
INVENTOR
ANTON P. M. VAN SNELLENBERG

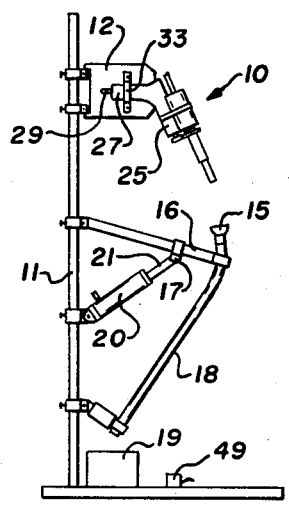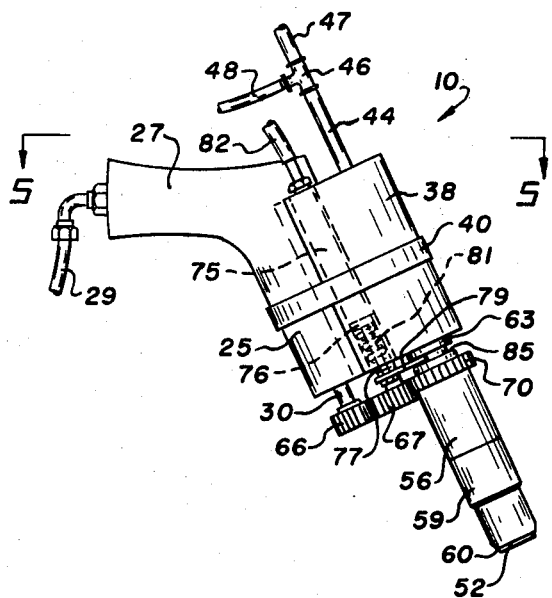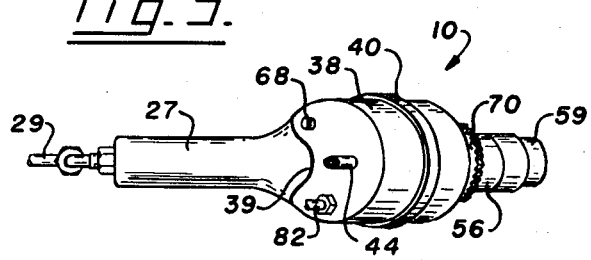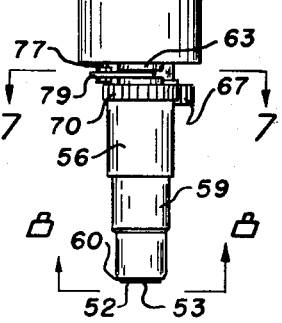

CUTTING APPARATUS FOR TISSUE-LIKE MATERIAL

This invention relates to apparatus for cutting soft tissue-like material from a soft or unsupported background, and particularly to apparatus for cutting glands out of membranes in the heads of fish.

There are glands in membranes of fish heads, and in particularly salmon fish heads, which have considerable medicinal value, but it has been extremely difficult to remove these glands from the membranes under normal conditions. There are large quantities of fish heads available in places such as fish canneries, and the value of these glands have been known for some time, but it has not been possible to cut these glands out in quantity in an economical manner. The difficulty is that these glands are attached to or form part of membranes which of themselves are very flimsy and it is difficult to cut the glands out at a reasonable rate without damaging the glands and even loosing them, since they are very small.

Apparatus according to the present invention is capable of cutting out these glands at a fair rate of speed and with very little difficulty. This is accomplished by drawing the gland and its background membrane against a suction head, and cutting the gland away from the membrane by a rotating cutter sleeve which surrounds the suction head. The gland may drop away from the head when the suction is cut off, or it may be blown off the suction head by air passing through the latter. A single operator is required, and he successively holds the fish heads against the suction head by hand, and the cutting operation takes place automatically. The operator closes a switch to cause the severed gland to be removed from the suction head, although this also can be done automatically.

Apparatus according to the present invention for cutting tissue-like material from a soft or unsupported background material, comprises a suction head to be placed against the tissue material to be removed from the background material, means for applying suction to said head to draw the tissue thereagainst, a rotatable cutter sleeve surrounding the suction head and having a cutting edge positioned to engage said background material when the tissue is drawn against the suction head, and means for rotating said sleeve to cut the tissue away from the background material. The cut away tissue can fall from the suction head when the suction is cut off, but it is preferable to provide means for directing air through this head to blow the tissue away therefrom. It is desirable to make the cutter sleeve movable relative to the head, and to provide means for moving the sleeve against the background material when the tissue is held against the suction head, and to move the sleeve in the opposite direction after the tissue has been cut out.

An example of a preferred form of apparatus according to this invention is illustrated in the accompanying drawings, in which FIG. 1 is a diagrammatic side elevation of a fish head that has been severed from the remainder of the fish, FIG. 2 is an enlarged end view of the fish head looking into the cavity therein where the membrane containing the gland is located, FIG. 3 is a reduced schemmatic side elevation of the cutting apparatus operatively mounted on a stand, FIG. 4 is an enlarged side elevation of the cutting apparatus by itself, FIG. 5 is a plan view of the cutting apparatus, FIG. 6 is a front elevation of this apparatus, FIG. 7 is a sectional view taken on the line 7—7 of FIG. 6, FIG. 8 is an enlarged view of the suction head and the surrounding cutter sleeve, FIG. 9 is an enlarged front elevation of the cutting apparatus with the lower position thereof shown in section, and FIG. 10 is a schematic control system for this apparatus.

Referring to FIGS. 1 and 2 of the drawings, 4 is a head that has been severed from a fish, such as a salmon. At the inner end of the head is a cavity 5, across the inner end of which is stretched a membrane 6 containing the gland 7 which has some medicinal value. It is difficult to remove the gland in an economical manner since it is attached to and supported by the membrane only which normally offers little if any resistance to a cutting knife, and the present cutting apparatus is designed to do this job.

FIGS. 3 to 9 illustrate cutting apparatus 10 according to this invention. The apparatus is mounted on a stand 11. A holder 12 is mounted on the stand near the top and preferably is vertically adjustable to suit the height of the operator of the apparatus. A receiver or cup 15 is mounted on the outer end of an arm 16, the opposite of which is swingably mounted at 17 on the stand beneath holder 12. Cup 15 is adapted to receive the gland after the latter has been cut away from the membrane of the fish head. The cup is mounted on and opens into the upper end of a tube 18 which extends downwardly to discharge into a receptacle 19. After the gland has been cut out of the membrane, cup 15 is moved towards apparatus 10 or the apparatus is moved towards the cup as desired. In this example, cup 15 is moved towards the cutting apparatus, and a fluid-operated cylinder 20 is provided for this purpose. The cylinder has a piston rod 21 projecting therefrom, and one of these elements is connected to stand 11 and the other to arm 16 so that this cylinder can be energized to swing cup 15 upwardly towards apparatus 10 and back away therefrom to the position shown in FIG. 3.

FIGS. 4 to 9 illustrate apparatus 10 in detail. A source of power is required in the apparatus for rotating the cutter sleeve. This may be an electric motor or, as shown, an air motor 25 may be used for this purpose. In this example, a standard air motor having a pistol grip 27 has been used. The reason for this is that these motors are readily available and easily adapted for this purpose. Air is supplied to motor 25 through a hose 29, and any desired control for this air, not shown, may be used. A desirable control will hereinafter be explained. Motor 25 has the usual power shaft 30. Pistol grip 26 has been used as means for securing motor 25 to holder 12 of stand 11. The pistol grip is secured to the holder by a suitable clamp 33, see FIG. 3.

Apparatus 10 includes a block 38 having a concave side 39 shaped to fit around the outer surface of motor 25, this block being releasably secured to the motor by a band 40, see FIGS. 4, 5 and 6. A tube 44 extends through and above and below block 38 and is fixedly secured thereto, said tube being shown extending above the block in FIGS. 4 and 6, and below the block in FIG. 9. A T-fitting 46 is connected to the upper end of tube 44, and hoses 47 and 48 are connected to this fitting. Hose 47 extends from a source of suction, not shown, while hose 48 extends from a source of pressure air, not shown. A suitable control system is provided for these hoses and preferably includes a foot-operated control switch 49 located at the bottom of stand 11.

Tube 44 has a reduced threaded lower end 51, and a suction head 52 is threaded on to said end 51. The lower part of head 52 is closed by a perforated supporting surface for end 53.

A slide 56 is mounted on tube 44 for rotation and sliding action between block 38 and head 52. This slide has a threaded portion 57 projecting downwardly therefrom, and a cutter sleeve 59 is threaded on said portion. Cutter sleeve 59 extends downwardly around suction head 52, and has a cutting edge 60 on its lower end. A stop 63 is connected to the upper end of slide 56, and when said stop engages block 38, the cutting edge of sleeve 59 is spaced a little above the level of the perforated end 53 of suction head 52.

Slide 56 is rotated by motor 25, and this is accomplished in any desired manner. In this example, a gear 66 is fixedly mounted on power shaft 30 of motor 25, meshes with an idler gear 67 mounted on a shaft 68 projecting downwardly from block 38, which, in turn, meshes with a large gear 70 surrounding and fixedly secured to the upper end of slide 56. Motor 25 rotates slide 56 and, consequently, cutter sleeve 59 through speed reduction gears 66, 67 and 70.

Suitable means is provided for selectively moving slide 56 and sleeve 59 up and down on shaft 44. In this example, an air cylinder 75 is mounted in and extends longitudinally of block 38, this cylinder having a piston 76 slidably mounted therein. A rod 77 extends downwardly from the piston through the lower end of cylinder 75 and beyond the bottom of block 38 where it is connected to a connector plate 79. A spring 81 in cylinder 75 biases piston 76 upwardly, and when air is directed into this cylinder through hose 82, the piston is moved downwardly. Connector plate 79 has bifurcated end 84 which fits into an annular groove 85 formed between the upper end of slide 56 and stop 63, see FIGS. 4, 6, 7 and 9.

When air is directed into cylinder 75, connector plate 79 moves downwardly, and this moves slide 56 and cutter sleeve 59 in the same direction so that the cutting edge 60 of the sleeve moves below the perforated end of head 52. When the air is released from cylinder 75, spring 81 moves piston 76 upwardly, and this moves the cutter sleeve in the same direction. This movement is not very great, and gears 67 and 70 are thick enough to permit it while remaining in mesh.

FIG. 10 diagrammatically illustrates an example of a control system for the cutting apparatus. Suction is maintained on suction head 52 during the operation of the apparatus, hose 47 being connected to a suitable source of suction, not shown. The degree of suction is sensed by a sensor 90, and when the vacuum increases to a predetermined point, a switch 91 is operated, said switch being in a pipe 92 which is connected to a source of air under pressure, not shown. Pipe 92 is connected to the hose 29 of motor 25 and to hose 82 of cylinder 75. Thus, when the vacuum drops in head 52 to a predetermined point, air is supplied to motor 25 and cylinder 75 to rotate cutter sleeve 59 and to move said sleeve into cutting position relative to the suction head.

Air control switch or valve 49 is connected by a pipe 95 to pipe 92, and by another pipe 96 to cylinder 20. Pipe 96 is also connected by a pipe 98 to suction hose 47.

The operation of cutting apparatus 10 is as follows:

The operator moves a fish head 4 to bring suction head 52 within cavity 5 thereof. This action moves gland 7 and a portion of membrane 6 against the supporting surface 53 of the suction head, partially or completely closing the perforations in surface 53 thereof. As a result of this, the degree of vacuum in line 47 increases until sensor 90 causes switch 91 to open to allow air to be directed to motor 25 and cylinder 75. This causes cutter sleeve 59 to move downwardly and to rotate so that it cuts the gland which is retained against supporting surface 53 away from membrane 6. The suction maintains the gland and the membrane in position to permit this cutting action to take place, and the surface 53 supports the membrane during this action. Then the operator opens valve 49 to permit air to be directed to cylinder 20 and into suction head 52 through line 47. This momentarily cuts off the suction, and the air blows the gland off the supporting surface of head 52 into cup 15, and through tube 18 into receptacle 19. At the same time, cylinder 20 retracts piston 21 to return cup 15 to the position clear of the suction head, as shown in FIG. 3. As soon as the operator takes his foot off valve 49, the suction is reapplied to head 52 so that it is ready for the next fish head.

With this apparatus, glands can be cut from fish heads just as fast as the latter are moved into position with their glands engaging the supporting surface of suction head 52. The actual cutting action is almost instantaneous, and the glands are cut cleanly away from their respective membranes.

I claim:

1. Apparatus for cutting tissue-like material from a soft or unsupported background material, comprising a suction head having a perforated end wall forming a supporting surface to be placed against the tissue material to be removed from the background material, means for applying suction to said head and through the supporting surface to draw the tissue against said surface, a rotatable cutter sleeve surrounding the suction head and having a cutting edge positioned to engage said background material around the supporting surface when the tissue is drawn against the supporting surface of the suction head, and means for rotating said sleeve to cut the tissue away from the background material while said tissue is retained against the supporting surface.

2. Apparatus as claimed in claim 1 in which said cutter sleeve is movable relative to said suction head, and including means for moving said sleeve into engagement with the background material when the tissue is drawn to the supporting surface of the suction head and moving the sleeve in the opposite direction after the tissue has been cut out of said background material.

3. Apparatus for cutting tissue-like material from a soft or unsupported background material, comprising a tube, a suction head mounted on an end of the tube and having a perforated end wall forming a supporting surface to be placed against the tissue material to be removed from the background material, means for applying suction to said tube and through the supporting surface, a cutter sleeve rotatably mounted on said tube and surrounding the suction head, a cutting edge on said sleeve positioned to engage said background material around the supporting head when the tissue is drawn against said surface, and means connected to the sleeve for rotating said sleeve around the tube to cut the tissue away from the background material while said tissue is retained against the supporting surface.

4. Apparatus as claimed in claim 3 including means for cutting off said suction, and means connected to said tube to direct air thereinto and through the supporting surface when the suction is cut off to blow the cut-out tissue away from the supporting surface of the suction head.

5. Apparatus as claimed in claim 3 in which said sleeve is slidably mounted on the tube, and including means for moving the sleeve along the tube to shift said cutting edge against the background material when the tissue is drawn against the supporting surface and moving the sleeve in the opposite direction after the tissue has been cut out of the background material.

6. Apparatus as claimed in claim 5 in which said moving means for the sleeve comprises a pneumatic cylinder operatively connected to said sleeve to reciprocate the latter on said tube.

7. Apparatus as claimed in claim 5 in which said moving means for the sleeve comprises an air cylinder having a piston rod projecting therefrom, coupling means for connecting said piston rod to the sleeve to cause said sleeve to slide on the rod when the piston rod is moved without interferring with the rotation of the sleeve.

8. Apparatus as claimed in claim 3 in which said means for rotating the sleeve comprises an air motor having a drive shaft, and driving means interconnecting said shaft and the sleeve to cause the latter to rotate on operation of the air motor.

9. Apparatus for cutting tissue-like material from a soft or unsupported background material, comprising a suction head having a perforated end wall forming a supporting surface to be placed against the tissue material to be removed from the background material, means for applying suction to said head and through said supporting surface to draw the tissue thereagainst, and cutting means adjacent the head positioned to engage said background material around the head when the tissue is drawn against the supporting surface of the suction head to cut the tissue away from the background material.

10. Apparatus for cutting tissue-like material from a soft or unsupported background material, comprising a suction head having a suction surface through which air is drawn into the head and to be placed against the tissue material to be removed from the background material, means for continuously applying a predetermined degree of vacuum to said head so as to draw the tissue against the suction surface thereof, said tissue against the head reducing the amount of air travelling through said suction surface and thereby causing the vacuum in the head to increase, a rotatable cutter sleeve surrounding the suction head and having a cutting edge positioned to engage said background material when the tissue is drawn against the suction head, an air motor operatively connected to the cutter sleeve to rotate the latter, and means responsive to said vacuum increase to direct air to the motor to rotate the sleeve to cut the tissue away from the background material.

11. Apparatus as claimed in claim 10 in which said cutter sleeve is movable into cutting position relative to said suction head and is normally retracted relative thereto, and including air-operated means for moving said sleeve into engagement with the background material when the tissue is drawn to the suction head, and means connecting said air-operated means to said responsive means whereby said vacuum increase causes air to be directed to the air-operated means to cause the cutter sleeve to move into cutting position when said sleeve is rotated.

12. Apparatus as claimed in claim 10 including means for directing air through the suction head to blow the gland off the suction surface thereof.

13. Apparatus as claimed in claim 12 including a cup positioned to receive the gland blown off the head suction surface.

14. Apparatus as claimed in claim 13 in which said cup is normally spaced away from the suction head, and including air-controlled means for moving the cup into position to receive the gland blown from the suction head.

15. Apparatus as claimed in claim 14 including means connecting said air-controlled means to said air directing means to cause the cup to move into gland-receiving position when the air blows the gland off the suction head surface.

16. Apparatus for cutting tissue-like material from a soft or unsupported background material, comprising a suction head having a supporting surface to be placed against the tissue material to be removed from the background material, means for applying suction to said head and through the supporting surface to draw the tissue against said surface, a rotatable cutter sleeve surrounding the suction head and having a cutting edge positioned to engage said background material around the supporting surface when the tissue is drawn against the supporting surface of the suction head, and means for rotating said sleeve to cut the tissue away from the background material while said tissue is retained against the supporting surface, said apparatus further including means for cutting off said suction, and means for directing air through said supporting surface of the head to blow the cut-out tissue away therefrom.

* * * * *